United States Patent [19]

Bartko, Kristine et al.

[11] Patent Number: 4,720,988
[45] Date of Patent: Jan. 26, 1988

[54] METHOD FOR THE PROFILING COLD-ROLLING OF RINGS WITH TANGENTIAL EXPANSION

[75] Inventors: Bartko, Kristine, Dohma; Gaebler, Dieter; Peter Heinrich, both of Karl-Marx-Stadt; Harald Schiller, Luckenwalde, all of German Democratic Rep.

[73] Assignee: VEB Kombinat Waelzlager u. Normteile, Karl-Marx-Stadt, German Democratic Rep.

[21] Appl. No.: 838,650

[22] Filed: Mar. 11, 1986

[30] Foreign Application Priority Data

Apr. 1, 1985 [DD] German Democratic Rep. ... 274668

[51] Int. Cl.⁴ .............................................. B21H 1/12
[52] U.S. Cl. ...................................................... 72/105
[58] Field of Search .................... 72/68, 105, 106, 110; 29/148.4 R, 149.5 DP

[56] References Cited

U.S. PATENT DOCUMENTS

| | | |
|---|---|---|
| 3,999,416 | 12/1976 | Brooks ................................. 72/105 |
| 4,017,739 | 4/1977 | Lapin et al. ........................... 72/105 |

FOREIGN PATENT DOCUMENTS

| | | |
|---|---|---|
| 1189514 | 3/1965 | Fed. Rep. of Germany ........ 72/105 |
| 2607755 | 4/1977 | Fed. Rep. of Germany . |
| 121284 | 7/1976 | German Democratic Rep. . |
| 583850 | 12/1977 | U.S.S.R. .......................... 29/148.4 R |
| 459923 | 3/1979 | U.S.S.R. .......................... 29/149.5 DP |

OTHER PUBLICATIONS

Berthold et al, *Wire World International*, vol. 26, Jul.-/Aug. 1984, pp. 153–155.

*Primary Examiner*—Lowell A. Larson
*Attorney, Agent, or Firm*—Jordan and Hamburg

[57] ABSTRACT

An internal or external annular surface of a ring which by cold-rolling is to be profiled with accompanying tangential expansion and substantial diametrical enlargement of the ring is preliminarily profiled by a metal-shaping process other than cold-rolling, the preliminary profile having distinctly defined lateral peripheral edges spaced from the lateral walls of the workpiece. The cold-rolling is effected by a cold rolling tool having formed on the working surface thereof facing the preliminarily profiled workpiece surface a profile which is shaped to make local contact with each of the edges of the preliminary profile of the ring and thereby begin compressively stressing the ring by the local contact before the cold rolling conforms the profile of the workpiece to the profile of the tool sufficiently to substantially increase the contact of the tool profile with the workpiece profile. The compressive stressing mitigates tensile stressing accompanying the aforementioned tangential expansion and substantial diametrical enlargement of the ring, thereby preventing the onset of cracking and other defects of the workpiece as the workpiece is cold-rolled.

4 Claims, 2 Drawing Figures

METHOD FOR THE PROFILING COLD-ROLLING OF RINGS WITH TANGENTIAL EXPANSION

BACKGROUND OF THE INVENTION AND RELATED ART STATEMENT

The invention relates to a method for cold-rolling of pre-profiled rings and can be preeminently used in the anti-friction bearing industry for the production of internal rings as well as external rings of anti-friction bearings of high accuracy of dimension and accuracy of shape.

Profiling rolling of rings is effected, in part, by hot-forming, whereby depending upon the method, only a limited accuracy of dimension and accuracy of shape can be achieved at relatively high production costs. Especially in the application of the method for the production of anti-friction bearing rings, because of the heating, there result decarbonized peripheral zones which have to be removed by subsequent working steps, which usually are performed by machining. A clear improvement of the accuracy of dimension and accuracy of shape is achieved for certain ring profiles by converting to cold-rolling. With internal, i.e., inward, profiles of rings, and also with some external, i.e., outward, profiles of rings, during the ring expansion phase of the cold-rolling, however, there is the danger that cracks form and defects are generated in the ring cross-section, because during the expansion, there result tangential tensile stresses in the ring, which cause in the ring surface which is not right away acted upon by the roller or rolling mandrel profile a uniaxial state of tensile stress.

Because of the formation of cracks and the generation of defects in the above-mentioned peripheral zones, cold-rolling can be used only to a limited extent for the production especially of anti-friction bearing rings.

According to DE-OS No. 2,607,755, for the cold-profiling of rings, there is proposed a multi-step rolling, whereby in the first steps only the profile, without expanding the diameter, is rolled into the ring. In subsequent steps takes place an even reduction of the thickness over the entire cross-section, which causes an increase of the diameter.

The disadvantage of this cold-rolling method consists in that it requires that the entire reshaping has to be carried out in several steps, whereby each step, in addition to an annealing process, above all requires respective different tool profiles.

Practically, the axial material flow intended in the first step can only be attained by additional apparatus for the limitation of the diameter, which requires relatively high control and finishing expenditures, which in turn has an unfavorable effect upon the operational reliability of the equipment for the execution of the method.

According to DD-PS No. 121,284 it is known to roll pronouncedly internally profiled rings in two steps, in that in the first step a ring workpiece is rolled with an external profile corresponding to the given internal profile, and in a second step, it is finished-rolled as the given internal profile. It is doubtful whether or not this method is realizable.

SUMMARY OF THE INVENTION

The object of the invention is to effectively remove the causes of the crack formation and the generation of defects in the profiling of rings, in order to make cold-rolling also applicable at high production reliability for the profiling of, in particular, internal rings and external rings of anti-friction bearings.

The object of the invention is to provide an expedient method with which in particular internal rings and external rings of anti-friction bearings, which, up to now, due to their profiling, could not be produced by cold-rolling, can be produced at high production reliability as well as accuracy of dimension and accuracy of shape in conventional machines and apparatus in one working step.

The object of the invention is attained in that the state of uniaxial tensile stress resulting from the tangential expansion is converted into a state of tensile-compressive stress.

For this purpose, there is machined a suitable preliminary profile into the initial shape for the expansion rolling. From the transition points thereof to the diameter of the bore or the external diameter there builds up, in connection with the tool profile, a compressive stress extending into the zones acted upon by unconstrained tension.

According to the invention, the production of this preliminary profile takes place during the turning of the initial ring which is required for the cold-rolling in any event, and does not involve any additional production costs. The resulting material losses are minimized by the shape of the preliminary profile. In the extreme case, the preliminary profile corresponds to the profile of the finished ring, whereby even in this case, due to the subsequent expansion, there is less material loss than in machining of the finished ring.

The advantage of the method according to the invention consists in its great economy, in that the cold-rolling of the preliminarily profiled ring takes place in only one rolling step by utilizing only one profiling roller and one rolling mandrel.

The method according to the invention will be explained in greater detail hereafter with reference to an apparatus for cold-rolling inwardly profiled rings with tangential expansion at considerable enlargement of diameter, such as, for instance, an external ring of a ball-bearing.

DETAILED DESCRIPTION OF PREFERRED EMBODIMENTS

Figure 1:
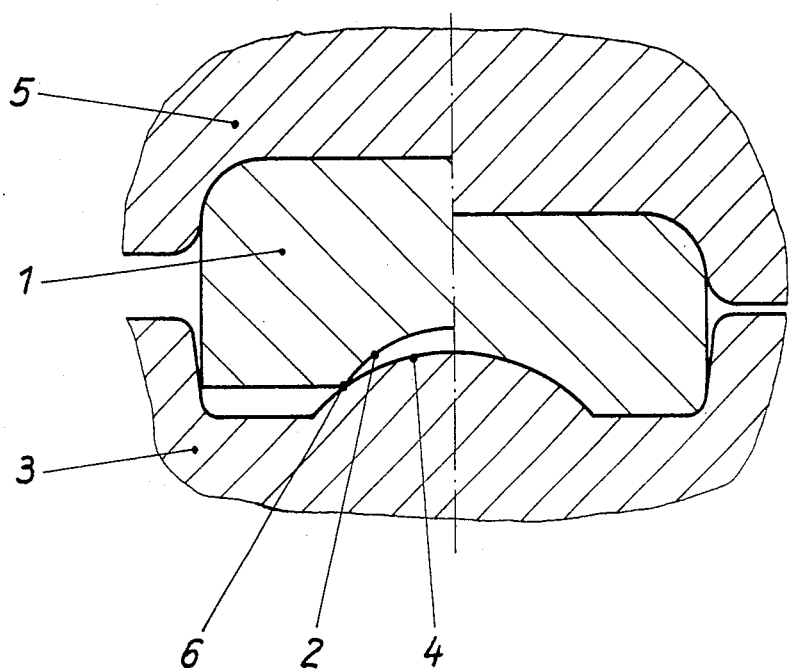
FIG. 1 a sectional view of the apparatus at the beginning and at the end of the rolling process of an external anti-friction bearing ring.

According to FIG. 1 there is illustrated the apparatus for the rolling of the initial part, i.e., workpiece 1 provided with a particular preliminary profile 2 into, for example, an external ring of an anti-friction bearing, the apparatus being provided with rolling mandrel or internal roller 3 with path profile 4 and working roller 5, whereby the preliminary profile 2 makes contact with its profile edges 6 at the start of the rolling with the roller path profile, i.e, roller annular profile, 4.

Due to the effect of the reshaping force exerted by the working roller 5, starting at the contact sites of the profile edges 6, in the direction of the lateral surfaces of the initial part 1 there is building up a compressive stress which superimposes upon the tensile stress during ring expansion. Thus, the absolute amount of the reshaping tensile stress is reduced and splitting as well as generation of defects is prevented.

Figure 2:
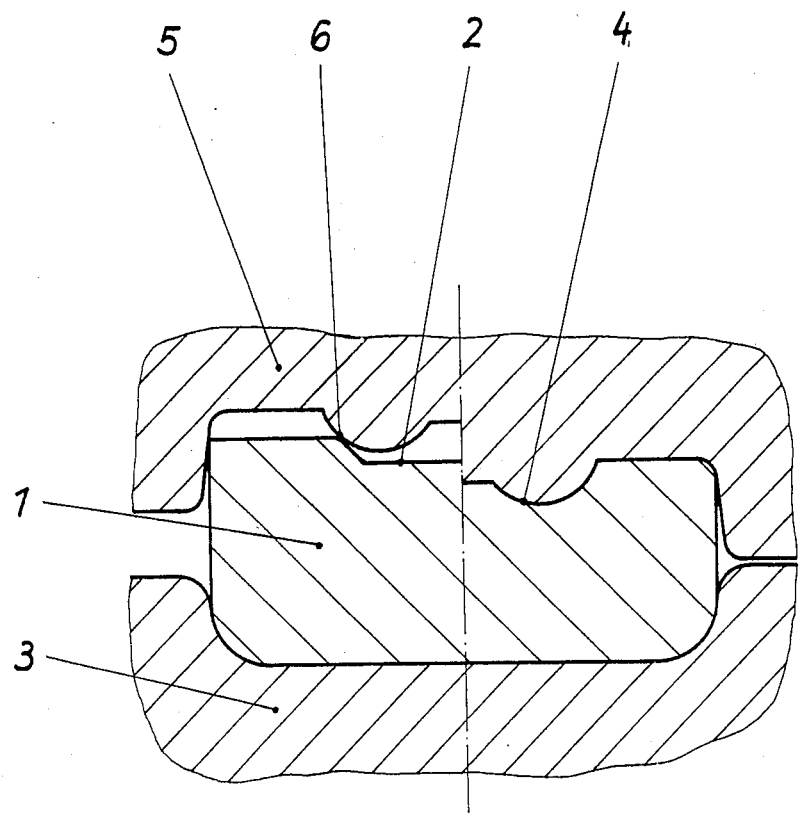
FIG. 2 a sectional view of the apparatus at the beginning and at the end of the rolling process of an internal anti-friction bearing ring.

FIG. 2 shows the arrangement of the apparatus for the rolling of an internal anti-friction bearing ring as initial part 1 of analogous configuration.

What we claim is:

1. A method of profiling an internal or external surface of a ring, employing a single cold rolling step, comprising forming a preliminary profile on an internal or external annular surface of a workpiece ring by a metal-shaping process other than cold rolling, said preliminary profile having distinctly defined lateral peripheral profile edges spaced from respective lateral walls of the workpiece ring; and bringing into and maintaining in rolling engagement with the preliminarily-profiled workpiece ring surface a rolling tool having formed on a working surface thereof facing said preliminary-profiled workpiece ring surface a final desired profile shaped to make local contact with each of said lateral peripheral profile edges of said preliminarily-profiled work-piece ring surface at the beginning of cold rolling to compressively stress said workpiece ring by said local contact before cold rolling effected by contact of the tool with the workpiece ring substantially increases contact of the tool profile with the preliminarily-profiled workpiece ring surface to conform the profile of the workpiece ring to the profile of the tool, wherein aid compressive stress mititgates tensile stress in the workpiece ring resulting from axial tangential displacement of workpiece ring material and enlargement of workpiece ring diameter during cold rolling to prevent the formation of cracks and deflects in the workpiece ring during cold rolling, whereby only a single cold rolling step is necessary to provide a profiled filed ring having a final desired profile.

2. Method according to claim 1, in which the preliminary profile is formed on the internal annular surface of the ring and the cold-rolling tool is a rolling mandrel positioned internally of the ring.

3. Method according to claim 1, in which the preliminary profile is formed on the internal annular surface of the ring and the cold-rolling tool is a roller positioned internally of the ring.

4. Method according to claim 1, in which the preliminary profile is formed on the external annular surface of the ring and the cold-rolling tool is a roller positioned externally of the ring.

* * * * *